UNITED STATES PATENT OFFICE.

WILLIAM A. DAY, OF BELLINGHAM, WASHINGTON.

COMPOSITION OF MATTER FOR SOLDERING CAST-IRON, MILD STEEL, ALUMINUM, AND THE LIKE.

1,195,955.

Specification of Letters Patent. Patented Aug. 22, 1916.

No Drawing. Application filed March 8, 1916. Serial No. 82,803.

*To all whom it may concern:*

Be it known that I, WILLIAM A. DAY, a citizen of the United States, and a resident of Bellingham, in the county of Whatcom and State of Washington, have invented a certain new and useful Composition of Matter for Soldering Cast-Iron, Mild Steel, Aluminum, and the like, of which the following is a specification.

My composition consists of the following ingredients, combined in the proportions stated, viz:

| | |
|---|---|
| Lead | 25 pounds |
| Tin | 25 pounds |
| Zinc | 50 pounds |

That is, said metals are combined in the proportion of one part of lead, one part of tin and two parts of zinc. These metals are to be melted and thoroughly mingled while in a molten condition and then molded in bars or rods suited for use as solder. I have found that this alloy is very useful in soldering cast iron, and mild steel and aluminum are also readily soldered with it. To prepare the articles for soldering with this alloy, the surfaces must be made clean and bright and then covered with stearic acid, or similar flux, when this solder applied with an extra hot soldering copper will be found to readily form an alloy with the surfaces to be joined. When soldering aluminum the surfaces should be brightened with the fatty flux in place. No other heat is required than that furnished by the hot soldering copper.

I am aware that it is not new to make a solder from an alloy of zinc, tin and lead, but I believe it to be new to use these metals in the proportions stated herein or in their near equivalent.

A somewhat different proportion of the several metals might be used successfully but I prefer substantially the proportions given.

I claim:

The herein-described composition of matter for soldering cast iron, mild steel, aluminum and the like, consisting of lead, one part; tin, one part; and zinc, two parts, fused together to form an alloy.

Signed at Bellingham in the county of Whatcom and State of Washington this 2d day of March A. D. 1916.

WILLIAM A. DAY.

Witnesses:
R. S. SIMPSON,
JOHN L. THOMAS.